US011409412B1

(12) United States Patent
Ho et al.

(10) Patent No.: US 11,409,412 B1
(45) Date of Patent: Aug. 9, 2022

(54) INTERACTIVE DIGITAL MAP INCLUDING CONTEXT-BASED PHOTOGRAPHIC IMAGERY

(71) Applicant: Google LLC, Mountain View, CA (US)

(72) Inventors: Kelvin Ho, San Francisco, CA (US); Jonathan Siegel, San Francisco, CA (US); Su Chuin Leong, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 593 days.

(21) Appl. No.: 16/040,111

(22) Filed: Jul. 19, 2018

Related U.S. Application Data

(62) Division of application No. 14/072,329, filed on Nov. 5, 2013, now Pat. No. 10,126,913.

(51) Int. Cl.
*G06F 3/0482* (2013.01)
*G06F 3/0485* (2022.01)
*G06F 3/04815* (2022.01)
*G01C 21/36* (2006.01)

(52) U.S. Cl.
CPC ....... *G06F 3/0482* (2013.01); *G01C 21/3664* (2013.01); *G06F 3/0485* (2013.01); *G06F 3/04815* (2013.01)

(58) Field of Classification Search
None
See application file for complete search history.

(56) References Cited

U.S. PATENT DOCUMENTS

| 6,014,607 | A | 1/2000 | Yagyu et al. |
| 6,356,297 | B1 | 3/2002 | Cheng et al. |
| 8,103,445 | B2 * | 1/2012 | Smith ............... G09B 29/007 701/425 |

(Continued)

FOREIGN PATENT DOCUMENTS

| JP | 2010026975 A | | 2/2010 |
| KR | 20100038646 A | * | 4/2010 |

OTHER PUBLICATIONS

Adobe Creative Team, "A First Look at the Book Module and Map Module in Adobe Photoshop Lightroom 4", Mar. 6, 2012, AdobePress, <http://www.adobepress.com/articles/article.asp?p=1842937>.

*Primary Examiner* — David P. Merlino
(74) *Attorney, Agent, or Firm* — Lerner, David, Littenberg, Krumholz & Mentlik, LLP

(57) ABSTRACT

A mapping system presents geographically relevant images. The images may be relevant to a search entered by the user, directions requested by the user, or any other factor relevant to the user's relationship to the displayed map. Moreover, the images may change in response to user actions or other factors, wherein new images "bubble up" as user context changes. The mapping system may display geographically relevant images by way of an information card presented in response to a user interacting with a point on a digital map. The user may interact with any of the geographically relevant images, causing an indicator of the map location associated with the image to be presented. Alternatively or additionally, a user interaction with a geographically relevant image may cause an interactive panoramic presentation of street-level imagery to be presented.

20 Claims, 10 Drawing Sheets

(56) References Cited

U.S. PATENT DOCUMENTS

| | | | |
|---|---|---|---|
| 8,493,408 B2 * | 7/2013 | Williamson | G06T 15/20 |
| | | | 345/629 |
| 8,635,557 B2 | 1/2014 | Geise et al. | |
| 9,576,394 B1 | 2/2017 | Kozko | |
| 10,066,958 B2 * | 9/2018 | Jung | G06F 3/0238 |
| 2002/0054162 A1 | 5/2002 | Fujihara | |
| 2003/0182052 A1 * | 9/2003 | DeLorme | G01C 21/3679 |
| | | | 701/533 |
| 2004/0100506 A1 | 5/2004 | Shiota et al. | |
| 2004/0210382 A1 | 10/2004 | Itabashi | |
| 2006/0271287 A1 * | 11/2006 | Gold | G01C 21/3673 |
| | | | 701/426 |
| 2007/0150188 A1 | 6/2007 | Rosenberg | |
| 2008/0285886 A1 | 11/2008 | Allen | |
| 2009/0254272 A1 | 10/2009 | Hendrey | |
| 2009/0325607 A1 | 12/2009 | Conway et al. | |
| 2011/0046881 A1 | 2/2011 | Karaoguz | |
| 2011/0098917 A1 | 4/2011 | LeBeau et al. | |
| 2011/0118974 A1 * | 5/2011 | Chang | G06T 11/60 |
| | | | 701/532 |
| 2011/0173565 A1 | 7/2011 | Ofek et al. | |
| 2012/0059576 A1 * | 3/2012 | Lee | G01C 21/3682 |
| | | | 701/409 |
| 2012/0259545 A1 | 10/2012 | Mitchell | |
| 2012/0304087 A1 | 11/2012 | Walkin et al. | |
| 2013/0050131 A1 | 2/2013 | Lee et al. | |
| 2013/0298083 A1 | 11/2013 | Bertoldo et al. | |
| 2013/0317735 A1 | 11/2013 | Mann | |
| 2013/0321395 A1 | 12/2013 | Chen et al. | |
| 2013/0335446 A1 | 12/2013 | Piippo et al. | |
| 2014/0053077 A1 | 2/2014 | Unnikrishnan et al. | |
| 2014/0351064 A1 * | 11/2014 | Kritt | G06T 11/00 |
| | | | 705/14.72 |

\* cited by examiner

US 11,409,412 B1

INTERACTIVE DIGITAL MAP INCLUDING CONTEXT-BASED PHOTOGRAPHIC IMAGERY

CROSS REFERENCE TO RELATED APPLICATIONS

The present application is a divisional of U.S. patent application Ser. No. 14/072,329, filed Nov. 5, 2013, the entire disclosure of which is incorporated herein by reference.

FIELD OF THE TECHNOLOGY

The present disclosure generally relates to presenting digital maps and related content via a user interface and, more particularly, presenting images of geographic locations along with a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Similar to traditional maps, digital maps visually represent information pertaining to geographical locations of natural and man-made structures. For example, a digital map can illustrate roads, railroads, hills, rivers, lakes, and towns within a selected geographic region. Today, interactive digital maps are available on various computing devices such as desktop and laptop computers, tablet computers, smartphones, etc. Software applications that provide interactive digital maps include special-purpose applications (developed specifically to display digital maps) and web browsers, for example. For convenience, all such software applications can be referred to as "mapping applications."

Some of the mapping applications provide additional geographic information and services along with digital maps. For example, the user can request navigation directions to travel between two locations, and the mapping application can display a possible route on the digital map. As another example, the user can search for certain businesses located in the area represented by the currently displayed digital map. Mapping applications typically provide cartographic or textual information in connection with these services.

SUMMARY

Features and advantages described in this summary and the following detailed description are not all-inclusive. Many additional features and advantages will be apparent to one of ordinary skill in the art in view of the drawings, specification, and claims hereof. Additionally, other implementations may omit one or more (or all) of the features and advantages described in this summary.

In one embodiment, a mapping system displays context-based imagery in conjunction with an interactive digital map. The mapping system selects images geographically relevant to the user's context and provides the images in conjunction with the interactive digital map so that a user may concurrently view the images and interact with the digital map. Moreover, the images may function as a portal to a street-level interface that provides an immersive and navigable three-dimensional environment.

In one embodiment, a non-transitory computer-readable medium stores instructions for providing efficient access to interactive street-level imagery for geographic locations. The instructions, when executed at one or more processor(s), cause a computing device to provide an interactive digital map of a geographic area via a user interface. The instructions then cause the device to receive a selection of a point on the digital map, where the selected point corresponds to a location within the geographic area. In response to receiving the selection, the instructions cause the device to provide an informational card that overlays the digital map and includes a street-level image corresponding to the location. The device receives a request by way of the user interface to activate display of street-level imagery. In response to receiving the request, the instructions cause the device to replace the digital map with an interactive panoramic presentation of street-level imagery at the location.

According to another embodiment, a method for providing efficient access to interactive street-level imagery for geographic locations includes providing, by one or more processor(s), a digital map of a geographic area on a screen. The method further comprises providing, by one or more processor(s), several street-level images in a dedicated area of the screen, where each of the plurality of street-level images corresponds to a respective location within the geographic area. One or more processor(s) may receive a selection of one of the plurality of images in the dedicated area. In response to the received selection, one or more processor(s) generate an indicator of the location corresponding to the selected image on the digital map. One or more processor(s) then receive a request to activate presentation of street-level imagery at the indicated location, and provide an interactive panoramic presentation of street-level imagery corresponding to the indicated location.

In another embodiment, a system includes one or more processors, a user interface coupled to the one or more processors, and a non-transitory computer-readable medium coupled to the one or more processors. The user interface is configured to detect user input and display user output. The computer-readable medium stores instructions that, when executed by at least one of the one or more processor(s), cause the one or more processors to determine a route between a pair of geographic locations. Further, the instructions cause the one or more processors to provide a digital map of a geographic area traversed by the route on the user interface. The instructions further cause the one or more processors to display via the user interface at least a portion of the route on the digital map and display via the user interface a plurality of selectable street-level images corresponding to locations along the route or visible from the route. Still further, the instructions cause the one or more processors to receive via the user interface a user selection corresponding to one of the plurality of selectable street-level images, and provide via the user interface an interactive panoramic presentation of street-level imagery at the location corresponding to the selected street-level image.

Yet another embodiment includes (i) a means to provide an interactive digital map of a geographic area via a user interface; (ii) a means to receive a selection of a point on the digital map, wherein the selected point corresponds to a location within the geographic area; (iii) a means to, in response to receiving the selection, provide an informational card that overlays the digital map and includes a street-level image corresponding to the location; (iv) a means to receive a request from the user interface to activate display of street-level imagery; and (v) a means to replace, in response to receiving the request, the digital map with an interactive panoramic presentation of street-level imagery at the location.

Another embodiment includes (i) a means for providing a digital map of a geographic area on a screen; (ii) a means for providing a plurality of street-level images in a dedicated area of the screen, wherein each of the plurality of street-level images corresponds to a respective location within the geographic area; (iii) a means for receiving a selection of one of the plurality of images in the dedicated area; (iv) a means for generating, in response to the received selection, an indicator of the location corresponding to the selected image on the digital map; (v) a means for receiving a request to activate presentation of street-level imagery at the indicated location; and (vi) a means for providing interactive panoramic presentation of street-level imagery corresponding to the indicated location.

Another embodiment includes (i) a means to determine a route between a pair of geographic locations; (ii) a means to provide a digital map of a geographic area traversed by the route on a screen; (iii) a means to display at least a portion of the route on the digital map; (iv) a means to display a plurality of selectable street-level images corresponding to locations along the route or visible from the route; (iv) a means to receive a user selection of one of the plurality of selectable street-level images; and (v) a means to provide an interactive panoramic presentation of street-level imagery at the location corresponding to the selected street-level image.

DETAILED DESCRIPTION

Overview

A context-driven image selection software module ("context engine") automatically selects context-based geographic imagery for display in conjunction with an interactive digital map on a client device. In an example implementation, the context engine operates on a server that provides map data to a client device via a communication network. To select geographic imagery, the context engine can consider a variety of signals and factors, referred to below as "extended geographic context." A mapping application running on the client device can display the selected geographic imagery in an unobtrusive manner so that a user can concurrently view the images and interact with the digital map. More particularly, user interaction with the digital map automatically affects the selection of images for display. Further, the mapping application can allow the user to interact with one of the images to activate the display of interactive street-level imagery at the corresponding location. In other words, the mapping application can provide convenient "portals" into the street-level imagery display mode.

As discussed in more detail below, an extended geographic context can be a collection of such signals as, for example, position of the viewport (defining the visible area of the digital map), speed at which the viewport is moving, direction in which the viewport is moving, zoom level, selection of map layers (e.g., traffic, weather), time of day, current date, and currently selected operation (e.g., search, navigation). Further, when the user consents to the use of such data, the extended geographic context can also include the user's current location, locations previously rated by the user, user's explicitly configured preferences, etc. The context engine in these cases may attempt to account for real-time data and historical data.

These techniques are discussed in more detail below with reference to FIGS. 1-10. In particular, an example system in which these techniques can be implemented is described with reference to FIG. 1. Various screenshots including context-based imagery and/or street-level images are described with reference to FIGS. 2, 4, 5, 7, and 9. An example method which may be implemented using the context engine is described with reference to FIG. 3. Various methods for providing a street-level interface are described with reference to FIGS. 6, 8, and 10.

Overview of an Example System for Providing Context-Based Geographic Imagery

Figure 1:
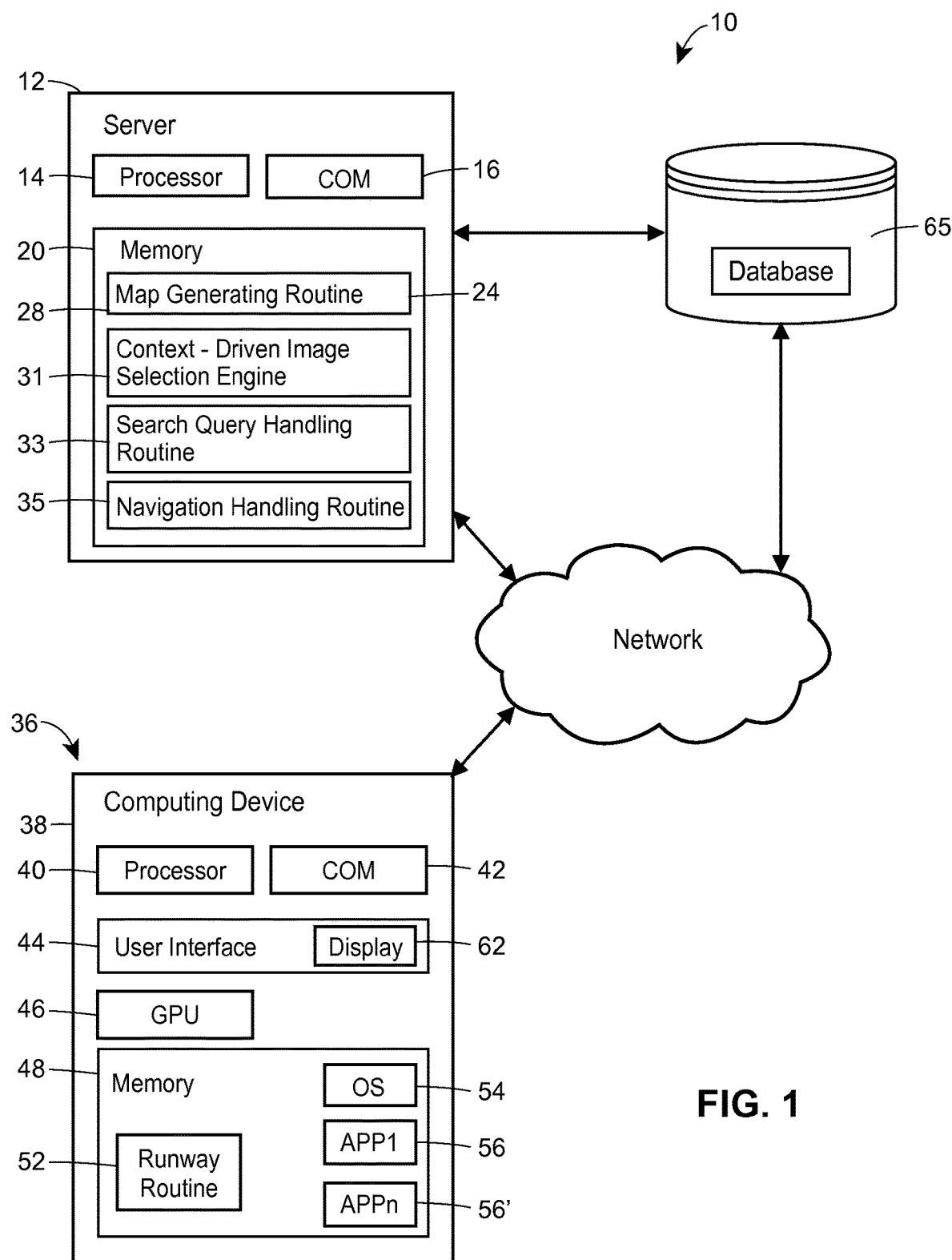
FIG. 1 illustrates an example computing system in which context-based geographic imagery is generated for display on a client device.

An example map display system 10 capable of implementing some or all of the techniques of the present disclosure is shown in FIG. 1. The map display system 10 is communicatively connected to a display system 36. In particular, a computing device 38 ("device 38") of the display system 36 is communicatively connected to a server 12 of the map display system 10 in a client-server relationship, where the device 38 is the client.

The server 12 is shown to be a server but it is to be understood that the server 12 may be any other type of computing device, including, and not limited to, a main frame or a network of one or more operatively connected computers. The server 12 includes various modules, which may be implemented using hardware, software, or a combination of hardware and software. The modules include at least one central processing unit (CPU) or processor(s) 14 and a communication module (COM) 16 capable of facilitating wired and/or wireless communication with the device 38 via any known means of communication, such as Internet, Ethernet, 3G, 4G, GSM, WiFi, Bluetooth, etc. The server 12 also includes a memory 20, which may include any type of non-transitory tangible memory capable of being incorporated with the server 12. Stored within the memory 20 is one or more applications or modules.

One application is a map generating route 28 configured to generate digital maps for display on a screen. In some implementations, the map generating routine 28 organizes map data in a vector graphics format into map tiles, which may be square regions of a certain size. The map generating routine 28 can provide these map tiles to client devices, such as a client computing device 38, for rendering (e.g., interpreting the vector data to generate bitmaps) and displaying on a screen. Additionally or alternatively, the map generating routine 28 provides bitmap images, such as already-rasterized map tiles, labels, metadata, etc. to client devices. The map generating routine 28 is stored in memory 20 in the form of instructions executable by the processor(s) 14, and may include, or cooperate with, additional routines to facilitate the generation and the display of map digital maps.

The map data in general includes data that specifies graphical elements of a digital map. For example, the map data may separately specify map elements representing roads, parks, bodies of water, external walls of buildings, and other natural and artificial objects visible outside, e.g., from above or at a street level. In one example scenario, the map data conforms to a vector graphics format and specifies 2D shapes along with colors, textures, etc. to be applied to these shapes. In another example scenario, the map data includes 3D mesh descriptions of buildings along with photographic imagery for texturing the corresponding 3D meshes. In yet another scenario, the map data includes both 2D and 3D map data.

A context-driven image selection engine 31 in an example implementation is stored to memory 20 and is made up of instructions executable on the processor(s) 14 (or multiple processor(s)). In operation, the context engine 31 selects, based on an extended geographic context, geographically relevant images to be displayed with the digital map. The context engine 31 may identify relevant map objects ("objects") based on various context signals. An object may be any point at a map location, or may be an entity at the map location. For example, the object may correspond to a point identified by a set of coordinates, a building, a town, a monument, a tourist attraction, a natural formation, etc. Objects such as roads can be represented by polylines, larger objects such as towns can be represented by polygons, etc. The context engine 31 may rate an object's relevance based on the object's relation to the extended geographic context.

In some instances, determining an object's relevance to the extended geographic context includes evaluating the available information about the object (such as the object's physical location, the object's viewport location, the object's popularity, the object's category or classification, etc.). Such information may be included in the database 65. For example, the database 65 may store an object profile for each object. An object profile may include information such as location coordinates, a textual description of the object, references to associated photographic images maintained by another service, (e.g., an online repository of user-submitted photographs of geographic entities) references to user reviews related to the object, and/or category tags or markers for the object (e.g., a famous building may have tags classifying it as a building, a tourist attraction, a landmark, a residence to a particular company, etc.). In any case, any suitable information pertaining to the object may be used to determine the object's relevance to an extended geographic context.

Moreover, the context engine 31 may interact with other routines to identify relevant objects. For example, a query handling routine 33 can identify a group of objects based on one or more search terms. Each of the identified objects may be assigned a score or relevance rating by the context engine 31 (e.g., if the query routine 33 provides a ranked list of search results, the relevance rating for an object may correlate to the object's relative ranking). Based on the identified group of objects, the context engine 31 can generate an extended search context, which may encompass additional search terms, objects, and/or categories of objects relevant to the identified group of objects and/or original search terms, and similarly assign a relevance rating to each of the identified additional terms/objects/categories. As another example, a navigation handling routine 35 may determine a route based on the origin, the destination, and map routing data (which may, for example, specify potential paths and associated times/distances). The context engine 31 may identify objects (or categories of objects) located on, or proximate to, the identified route and may assign a relevance rating to the objects. Similarly, the context engine 31 may identify relevant objects based on viewport area, user location/movement, a user profile, current events, predicted user objectives, etc. In one example embodiment, the context engine 31 can identify a group of relevant objects having the highest overall relevance (e.g., based on an object's determined relevance rating for multiple objects).

The context engine 31 also identifies photographic images associated with the extended geographic context. The photographic images can be, for example, "flat" photographs, panoramic photographic such as street-level images taken, aerial photographs, still from video feeds, etc. The photographic images in general can be collected from various real-world locations and orientations. Further, these images can be collected in any suitable manner. For example, images can be collected using vehicles carrying cameras to systematically capture, at regular intervals, photographs from various angles and directions relative to the vehicle's position. In some cases the images may be user-uploaded images. Regardless of the method of capture, each relevant object identified by the context engine 31 may be associated with zero, one, or multiple photographic images. The context engine 31 may select images for display by rating the images according to visual signals, for example, which may include one or more of the following: image type, image quality, image popularity, map viewing mode, etc.

The photographic images can be stored in one or more memories 20, databases 65, and/or repositories accessible to the map display system 10. The images in general can be stored using any one or multiple suitable digital formats.

With continued reference to FIG. 1, the digital map data and image data can be sent via the communication module 16 from the server 12 to the display system 36. The device 38 of the display system 36 receives the map data and a software application renders the data to generate the digital map and images for display. In one example embodiment, the client computing device 38 includes processor(s) (CPU) 40, a communication module (COM) 42, a user interface (UI) 44, a graphic processing unit (GPU) 46, and a memory 48 (which may be and/or include any type of non-transitory tangible memory capable of being incorporated with the device 38, such as RAM, ROM, etc.). The device 38 may be portable or stationary and may be any suitable computing device (e.g., laptop, desktop, tablet, mobile phone, etc.). Stored within the memory 48 is an operating system (OS) 54 and at least one application 56, 56', both of which may be executed by the processor(s) 40. The UI 44 may include output components such as the display 62 (which may be a touchscreen capable of detecting one or more points of contact on the touchscreen) and input components (not shown) such as a keyboard, mouse, microphone, etc. At least one of the applications 56, 56' is capable of facilitating the display of the map and image data received from the server 12.

In an example implementation, the application 56 renders map data received from the server 12 to generate a digital map for display via the UI 44. When the user changes the zoom level, pans across the map, selects a different map type (e.g., traffic map, terrain map), or otherwise interacts with the digital map, the software application re-renders the data to generate an updated digital map.

The memory 48 may also include a runway generating routine 52 ("runway routine 52") that operates in the map application 56. The runway routine 52 may create a "runway," or strip that includes images received as a result of communication with the server 12. The strip can be oriented horizontally, vertically, diagonally, etc. In an example implementation, the runway overlays the digital map so as to maximize the area of the screen taken up by the map.

The generated runway may be scrollable so that additional identified images may be displayed. The runway routine 52 may also generate, in response to a detected selection of an image in the runway, an indicator to be displayed in conjunction with the digital map. The indicator identifies a location on the digital map corresponding to an object associated with the selected image. In one example, the indicator may be a line extending from the selected image to a point on the map corresponding to the location. In another example, the indicator may be an icon presented at the point, a border around an area including the point, a color coded region of the map including the point, etc.

In some embodiments, a user interaction with a map object (e.g., at a location or point on the digital map corresponding to the map object) or a photographic image related to the map object causes the device 38 to present an information card graphic for the map object, as an overlay of the digital map, at the display 62. The user interaction may be a touch or gesture detected at a touchscreen, a detected mouse click, or a detected mouse hover. The information card graphic may include textual information relating to the object (such as a description, user reviews, contact information, etc.), photos relating to the object, and/or interactive graphics. In some cases the photos displayed in the information card can be context-based images selected by the context engine 31. For example, when a user interacts with one of the interactive graphics, the device 38 may present the street-level interface. As another example, user interaction with an interactive graphic may cause the device 38 to present directions to/from the object or to launch a navigation interface that directs the user to the location of the object.

In some embodiments, a user interaction with a photographic image displayed in conjunction with the digital map (e.g., in a runway or information card) causes the device 38 to present a street-level interface at the display 62. The user interaction may be a finger gesture detected via a touchscreen, a detected mouse click, a detected mouse hover, etc. The map application 56 can provide the street-level interface for viewing and navigating an immersive visual environment in which panoramic street-level images are presented from the perspective of a virtual camera. The street-level interface can be presented in response to a received signal indicating a request or command to display/activate the street-level environment. The request may be received in response to a user selecting a point on a map displayed at the UI 44 (e.g., via touch or mouse) or an image associated with the point on the map (e.g., the image may be associated with an object located at the point). The map application 56 can receive street-level interface data from the server 12. In some instances, the image data received by the device 38 represents images selected by the context engine 31. The device 38 renders the provided street-level data to provide a three-dimensional walkthrough environment composed of photographic imagery that can be navigated by way of user input at the UI 44. When the street-level interface launches, the device 38 may display a larger version (e.g., full-screen) of the image originally interacted with by the user. The user may navigate the street-level environment and change the displayed imagery by manipulating the point-of-view from which imagery is displayed. For example, a user may interact with a designated area of the screen or use a keyboard to change the camera's position or orientation.

In operation, the device 38 may provide the street-level environment by identifying an initial position and orientation for the camera. The initial position may be identified based on the location of an object the user interacted with (e.g., the user may have clicked on a map object, or interacted with an image associated with the map object, having a certain location). In some instances the initial position and/or orientation of the camera may be identified based on a default state saved to memory. The device 38 retrieves (e.g., from the database 65) photographic images corresponding to a point-of-view ("POV") from the camera's position and orientation. The device 38 then provides a panorama or composition of stitched images to provide a photographic display of the environment from the POV of the camera. Stitching images together may include manipulating the images (e.g., adjusting the curvature of some parts of the images) to present a seamless transition from one image to another. The street-level interface presented by the device 38 can provide six degrees of freedom of movement for the camera, allowing the environment to be navigated in any direction and/or viewed from any perspective. As the camera's position and/or orientation changes, the device 38 retrieves images corresponding to the new position/orientation. The device 38 may present images or animations to facilitate transitions between POVs (e.g., adjusting the center of focus of displayed images or blurring images to simulate movement).

In one example implementation, the map application 56 is a web browser that controls a browser window provided by the OS 54 and displayed at the UI 44. During operation, the map application 56 retrieves a resource, such as a web page, from a web server (not shown) via a wide area network (e.g., the Internet). The resource may include content such as text, images, video, interactive scripts, etc. and describe the layout and visual attributes of the content using HTML or another a suitable mark-up language. Additionally, the resource requests that a portion of the browser window be allocated for display of map data and images on a runway, and provides an application programming interface (API) for accessing the map data and the image data from the server 12. Once the device 38 receives the resource, the map application 56 displays the received content in the browser window, allocates a portion of the window in the form of an embedded window for display of map data and the runway with images, and executes the API to retrieve the map data and the image data and to render the received data within the embedded window. Thus, according to this implementation, the server 12 specifies how map data is to be displayed as well as how the images are to be displayed over (or next to) the map image within the embedded window on the device 38. In other words, the map application 56 obtains map data and image data and renders both types of data within the same window using the same API, according to this example implementation.

Several example methods, which may be implemented with the components described in FIG. 1, are discussed below for facilitating the display, at an electronic device, of (i) a street-level interface or a (ii) a map interface including context-based imagery, runway images, and/or information cards overlaying digital map imagery. As one example, the methods may be implemented as computer programs stored on a tangible, non-transitory computer-readable medium (such as one or several hard disk drives) and executable on one or several processor(s). Although the methods shown can be executed on individual computers, such as servers or personal computers (PCs), it is also possible to implement at least some of these methods in a distributed manner using several computers, e.g., using a cloud computing environment.

Presenting Context-Based Imagery and Providing a Street-Level Interface

Figure 2:
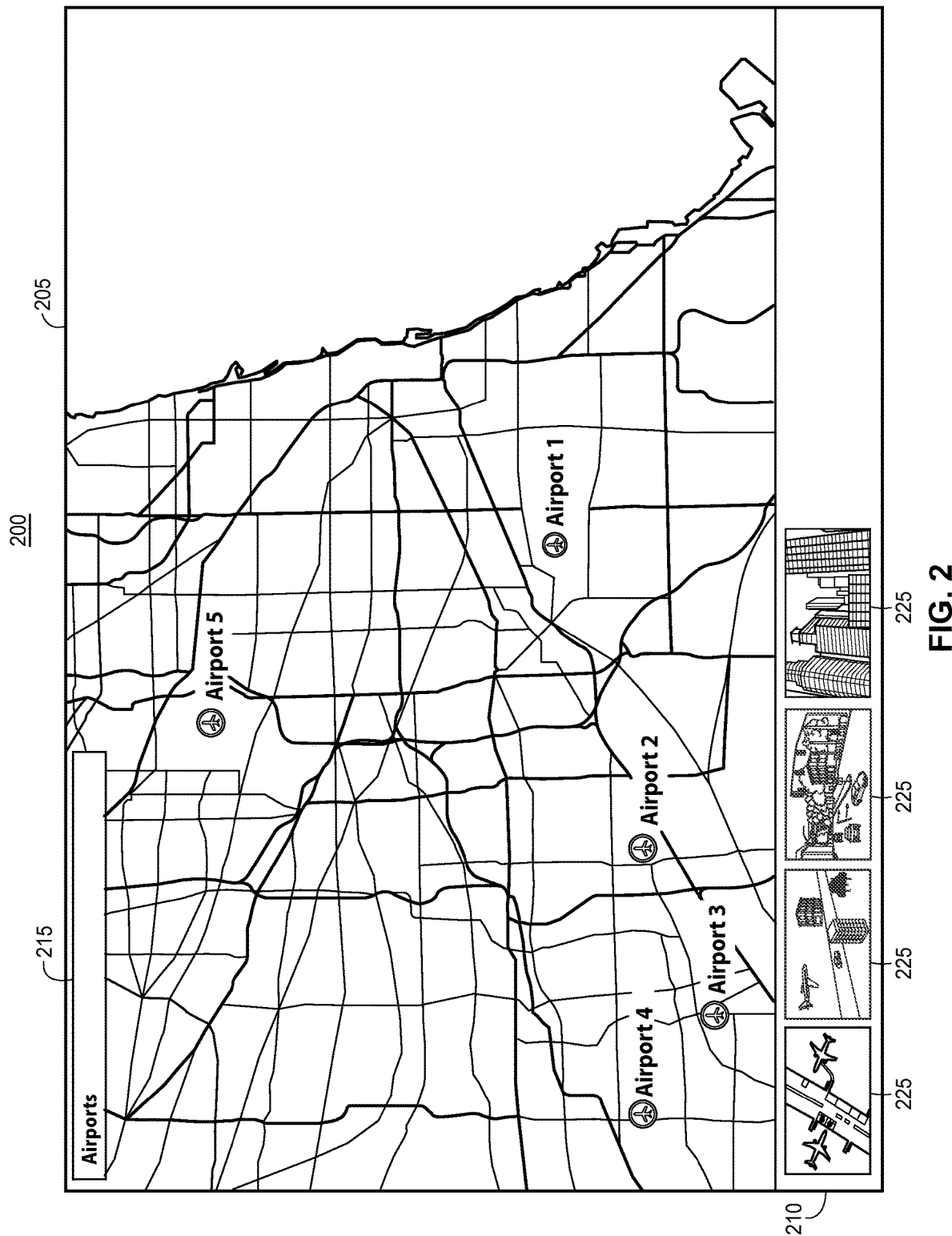
FIG. 2 illustrates an example screenshot of a digital map and a runway area including context-based images, which can be displayed via the user interface of the client device of FIG. 1.

FIG. 2 illustrates an example screenshot 200 of a digital map 205 and runway area 210 including images 225 selected using an extended geographic context in accordance with the techniques of the present disclosure, which may be displayed at a UI of a computing device. For example, software modules 56 and 52 can generate the screenshot 200 in response to a user entering a search term such as "airports" via the search box 215. Alternatively, these software modules can generate the screenshot 200 in response to a user entering a search term such as "Airport 1," where a context engine determines the object category "airports" is relevant (in this case, because of Airport 1). In any event, the runway area 210 includes context-sensitive images 225 that are associated with relevant objects (such as the displayed airports). In addition to including street-level imagery related to the displayed airports, the runway area 210 also includes images associated with other relevant objects or object categories. For example, one or more of the images 225 in the runway area 210 may be street-level images for a particular hotel or train station identified based on the identification of relevant categories such as "hotels" and/or "public transit."

Figure 3:
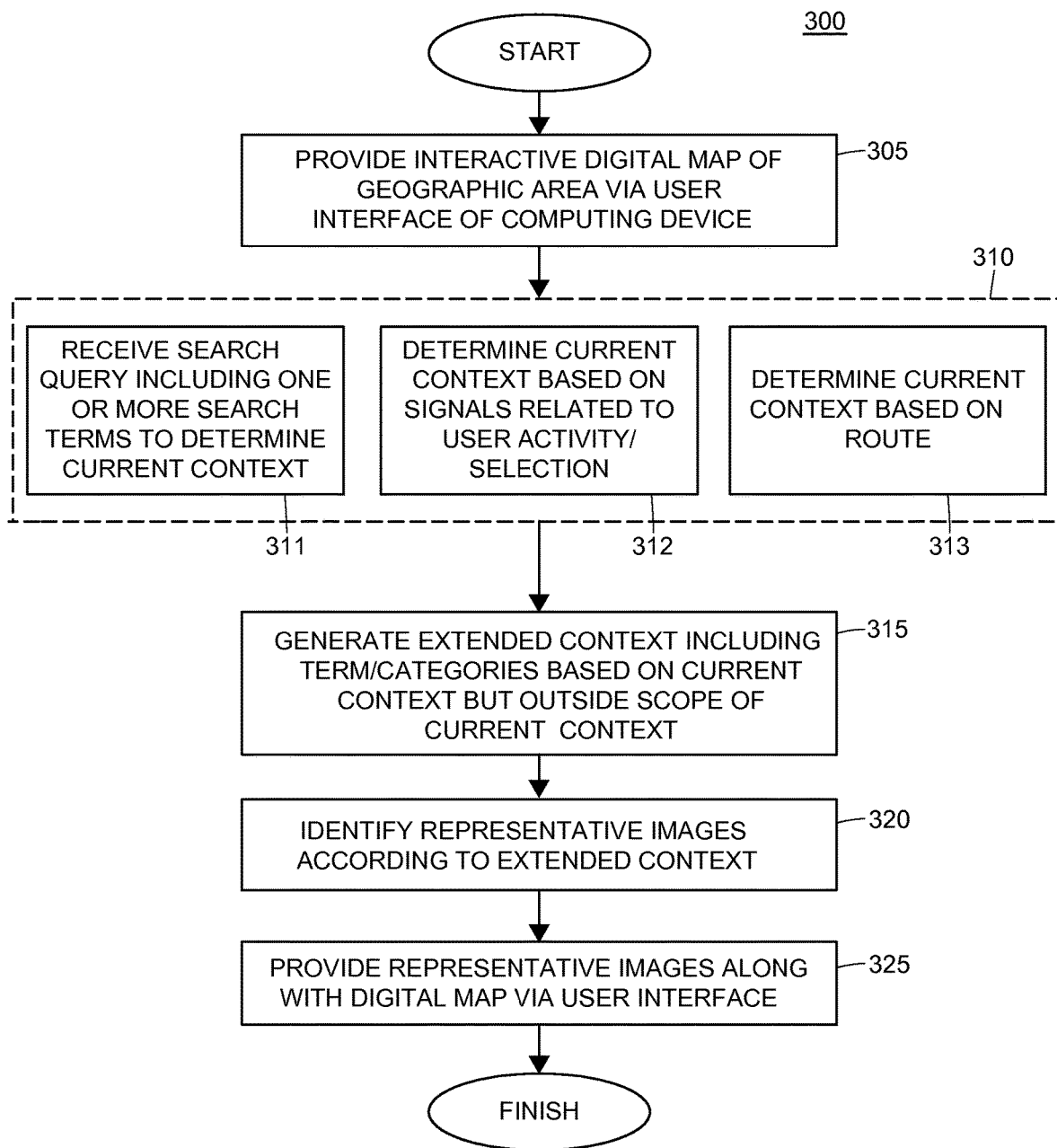
FIG. 3 is a flow diagram of an example method for providing context-based images with a digital map, which can be implemented in the computing system of FIG. 1.

FIG. 3 illustrates an example method 300 for providing images in conjunction with an interactive digital map at a UI of a computing device using an extended geographic context. The method 300 may be implemented, in whole or in part, at the map display system 10 and/or the display system 36 shown in FIG. 1. In particular, the method 300 may be implemented as a set of instructions stored on a computer-readable memory that are executable by one or more processor(s).

The method 300 begins when a UI of a computing device provides an interactive digital map of a geographic area (block 305). A current, not yet extended, geographic context is then determined (block 310). In the illustrated example, the current geographic context may be determined using signals representing one or several of (i) search terms (block 311), (ii) detected user interactions with the map content (block 312), and (iii) route information presented to a user (block 313). Depending on the implementation, any combination of signals corresponding to blocks 311-313, as well as other suitable signals, can be used. In short, determining the current context may include accounting for any signal indicative of a factor identifying a user's relationship to displayed map content. The context signals may be application-specific or general in nature.

Application-specific context signals generally represent factors related to the operation of the application(s) responsible for generating/providing the map content. For example, a context signal may represent the current geographic area being displayed via the map viewport (for example, the City area in FIG. 2). In some instances, context signals may identify one or more map objects marked or identified for display to the user (e.g., a town, restaurant, road, etc.). Context signals may also identify a map layer used for displaying the map content (such as a satellite imagery layer or a traffic information layer). Context signals may correlate to user interactions with map content, such as: a search query entered by a user (e.g., the term "airports" shown in search box 215 of FIG. 2); a map object selected or interacted with by a user; an image selected by a user; a request for directions or navigation entered by a user; etc. One or more context signals may also represent sensor information, such as position and/or movement information, captured by the computing device displaying the map content.

In comparison to application-specific context signals, general context signals represent factors independent of the user's direct interaction with the displayed map content. For example, general context signals may represent: the current time and/or date; user profile information (e.g., historical information, user preferences, etc.); event information; weather information; third party information (e.g., trending searches, trending map objects, third party reviews, etc.); traffic information; etc.

After identifying a current context, an extended geographic context is generated at block 315. The extended geographic context can include extended context signals in addition to the current context signals. Extended context signals generally represent factors potentially relevant to a user's relationship to displayed map content. While the current context accounts for detectable or discernible factors (such as detected user actions, content provided to the user, historical user information, etc.), extended context signals accounts for factors not explicitly provided or defined. For example, extended context may account for map objects or categories of potential interest (e.g., the categories "hotel" and "public transit" identified in response to the search term "airport," as discussed with regard to FIG. 2); user preferences and activities (provided the user consented to such use of the data), etc. Consequently, the extended geographic context can include signals representing factors outside the scope of the current context.

The extended geographic context then can be used to identify representative images (block 320). In general, representative images are identified by identifying map objects or categories relevant to the extended geographic context and then identifying images associated to the relevant objects. The representative images may be identified by the image identifying routine 30 of FIG. 1, for example.

After being identified, the representative images are provided at the UI along with the digital map (block 325). In some instances the UI only provides some of the identified representative images (e.g., images having the highest rating from the image rating routine 29 of FIG. 1).

Figure 4:
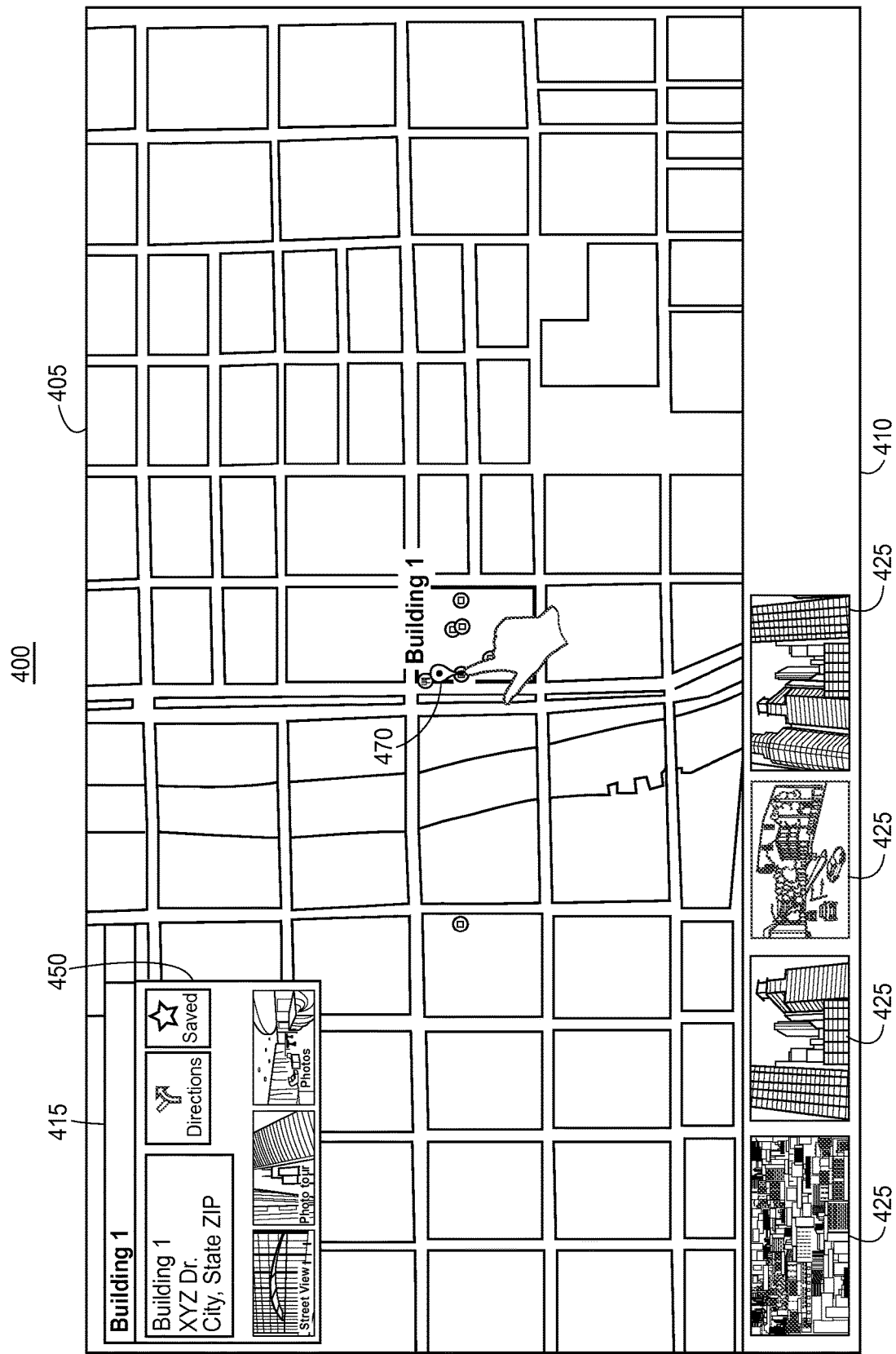
FIG. 4 illustrates an example screenshot of a digital map and an overlaying information card, which can be displayed via the user interface of the client device of FIG. 1.

FIG. 4 illustrates an example screenshot 400 of a digital map 405 and an information card 450 that may be displayed at a UI of a computing device as a result of the example systems and methods described herein. In the shown example, the information card 450 is displayed in response to a user interacting with a corresponding object at location 470 ("Building 1" in this case) or image of the object (displayed in the runway 410, for example). The information card 450 may include text relating to the object, such as an address, general description, or review/comments from other users. The information card 450 may also include interactive graphic elements that allow the user to request directions to the object or save the object as a preferred or favorite object. The information card 450 may also include images (e.g., thumbnail images) that, when interacted with, enable a user to view a photo tour of the object; view user uploaded photos related to the object; or view street-level images. Interacting with the street-level image thumbnail causes a street-level interface to launch, as described with regard to FIG. 1.

Figure 5:
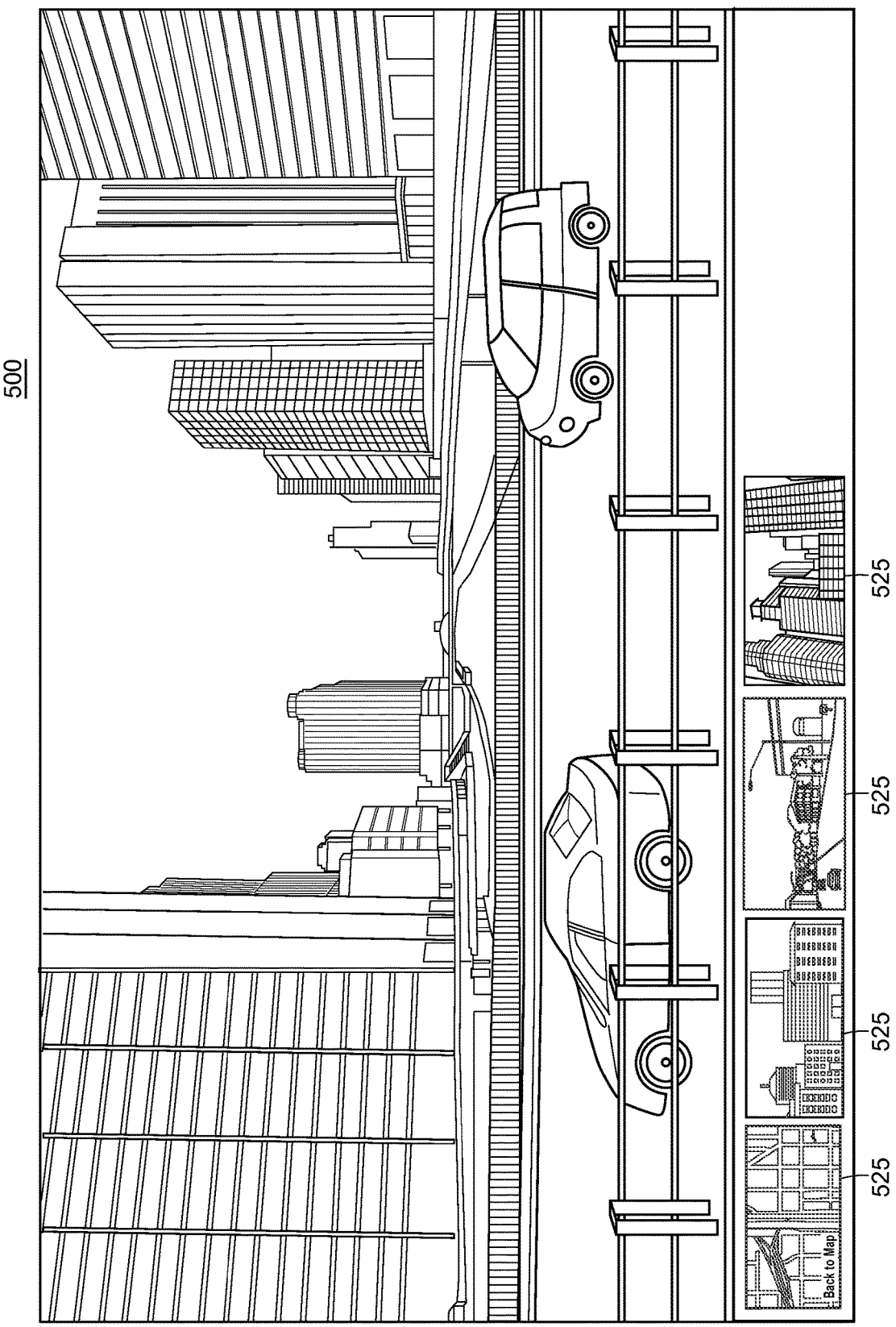
FIG. 5 illustrates an example screenshot of interactive panoramic street-level imagery, which can be displayed via the user interface of the client device of FIG. 1.

FIG. 5 illustrates an example screenshot 500 of an interactive panoramic street-level interface that may be displayed at a UI of a computing device in accordance with the techniques of the present disclosure. The screenshot 500 may be displayed in response to detecting a selection of a street-level image displayed in conjunction with a digital map. For example, a runway image or information card image may serve as an entry point into the street-level interface. Once in the street-level interface, a user may change the displayed imagery by interacting with the interface to adjust the perspective and/or position from which the POV is determined. Moreover, a user may interact with one of the images 525 to view the street-level interface from a different map location or to exit the street-level interface and go back to the map interface displaying the interactive digital map.

Figure 6:
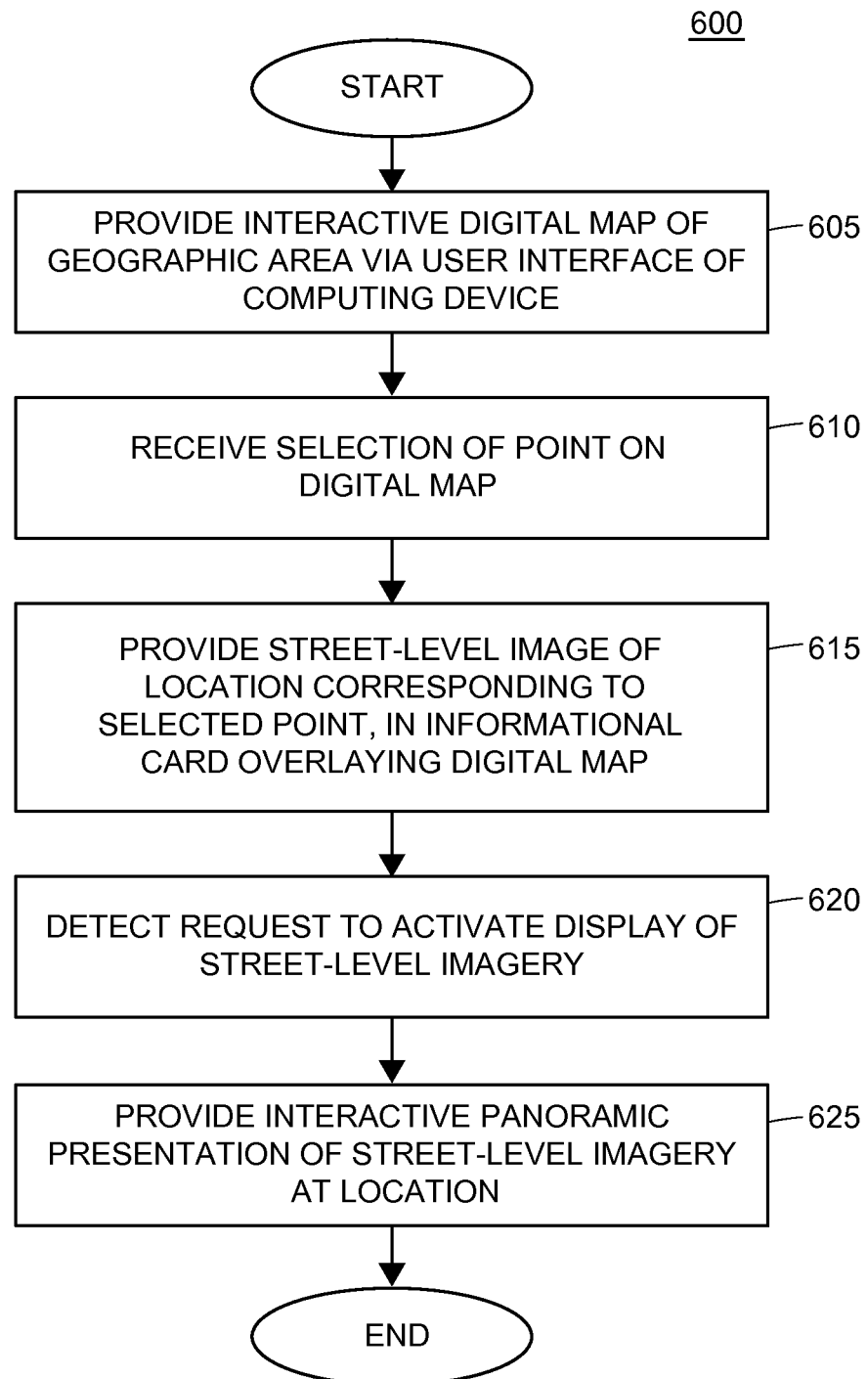
FIG. 6 is a flow diagram an example method for providing an interactive panoramic presentation of street-level imagery in response to detecting a request to activate street-level imagery, which can be implemented in the computing system of FIG. 1.

FIG. 6 illustrates an example method 600 for providing an interactive panoramic presentation of street-level imagery in response to detecting a request to activate street-level imagery. The method 600 may be implemented, in whole or in part, at the map display system 10 and/or the display system 36 shown in FIG. 1. For example, the method 600 may be implemented as a set of instructions stored on a computer-readable memory that are executable by one or more processor(s).

The method 600 begins when an interactive digital map of a geographic area is presented at a UI of a computer device (block 605). The UI then receives a selection of a point on the digital map (block 610). A location for the selected point is determined and a street-level image for the selected point is identified. The street-level image corresponding to the selected point is provided in an informational card overlaying the digital map (block 615). The information card may include context-sensitive images as discussed regarding FIG. 1.

A request to activate a display of street-level imagery is detected (block 620). The request may be any received via any suitable user input at a UI. In general, the request is represented by a user interaction with the street-level image provided in the information card. In response to the request, the UI provides an interactive panoramic presentation of street-level imagery at the location (block 625).

Figure 7:
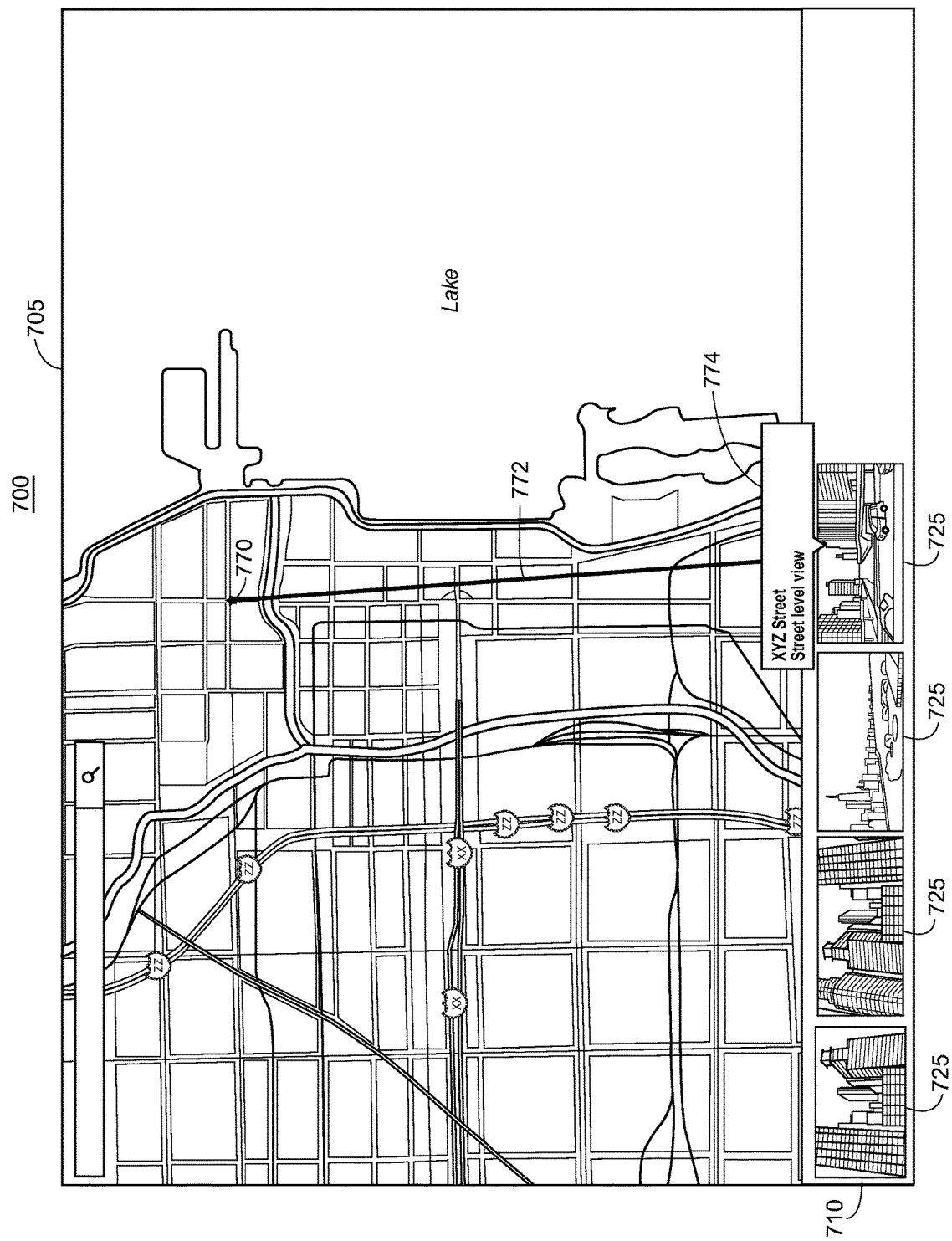
FIG. 7 illustrates an example screenshot of a digital map, including an indicator identifying a location on the map, which can be displayed via the user interface of the client device of FIG. 1.

FIG. 7 illustrates an example screenshot 700 of a digital map 705, including an indicator 772 identifying a location on the map 705, that may be displayed at a UI of a computing device as a result of the example systems and methods described herein. The screenshot 700 includes a location indicator 772 for a map object at location 770. The screenshot 700 may be presented in response to receiving a selection of an image relating to the map object. In this example, a user has selected an image by interacting with an image 725 in the runway 710. In response, a location indicator 772 has been generated to identify the location of 770 of the map object associated with the selected image. A label 774 has also been generated and presented for selected image.

Figure 8:
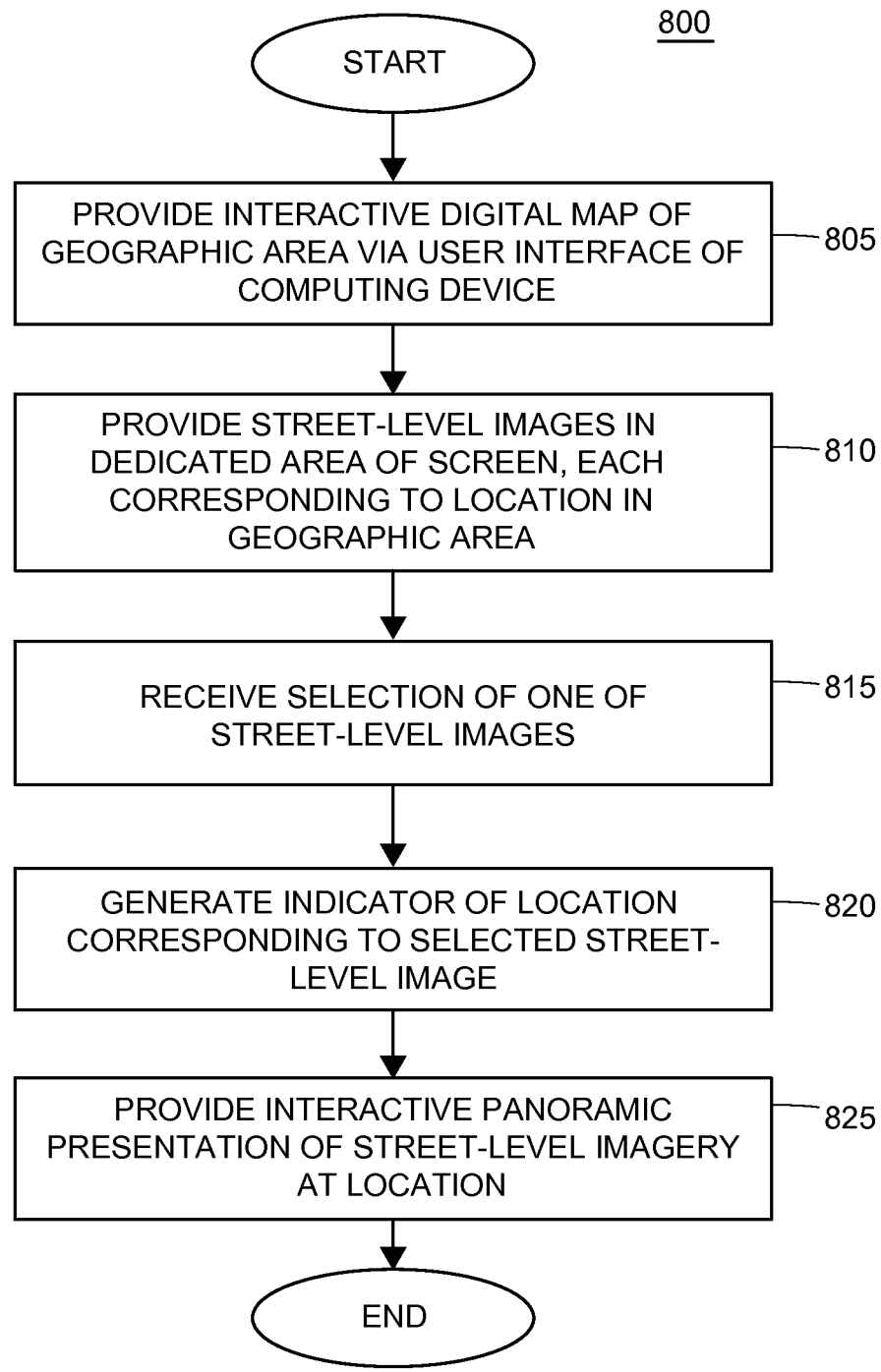
FIG. 8 is a flow diagram of an example method for identifying the location of an object on a digital map and providing an interactive panoramic presentation of street-level imagery at identified the location, which can be implemented in the computing system of FIG. 1.

FIG. 8 illustrates an example method 800 for identifying the location of an object on a digital map and providing an interactive panoramic presentation of street-level imagery at a UI of a computing device. The method 800 may be implemented, in whole or in part, at the map display system 10 and/or the display system 36 of FIG. 1. In particular, the method 800 may be implemented as a set of instructions stored on a computer-readable memory that are executable by one or more processor(s).

The method 800 begins when a UI of a computing device provides an interactive digital map of a geographic area (block 805) as well as street-level images in a dedicated area of the screen, where each image corresponds to an object and/or location in the depicted geographic area (block 810). The street-level images may be included in an area determined by the runway generating routine 32 discussed regarding FIG. 1.

Upon receiving a selection of one of the street-level images (block 815), the UI displays an indicator (e.g., the visual indicator 772 shown in FIG. 7) identifying the location corresponding to the selected street-level image (block 820).

When an interaction associated with the location or street-level image is detected, the UI provides a street-level interface that presents an interactive panoramic presentation of street-level imagery at the location (block 825). In some examples, the user may interact with the location 770, which may cause the UI to display an information card for a map object at the location 770. The user may then interact with a street-level image shown in the information card, causing the UI to provide the street-level interface. In some instances, the street-level interface may launch in response to the user interacting with the image 725 a second time.

Figure 9:
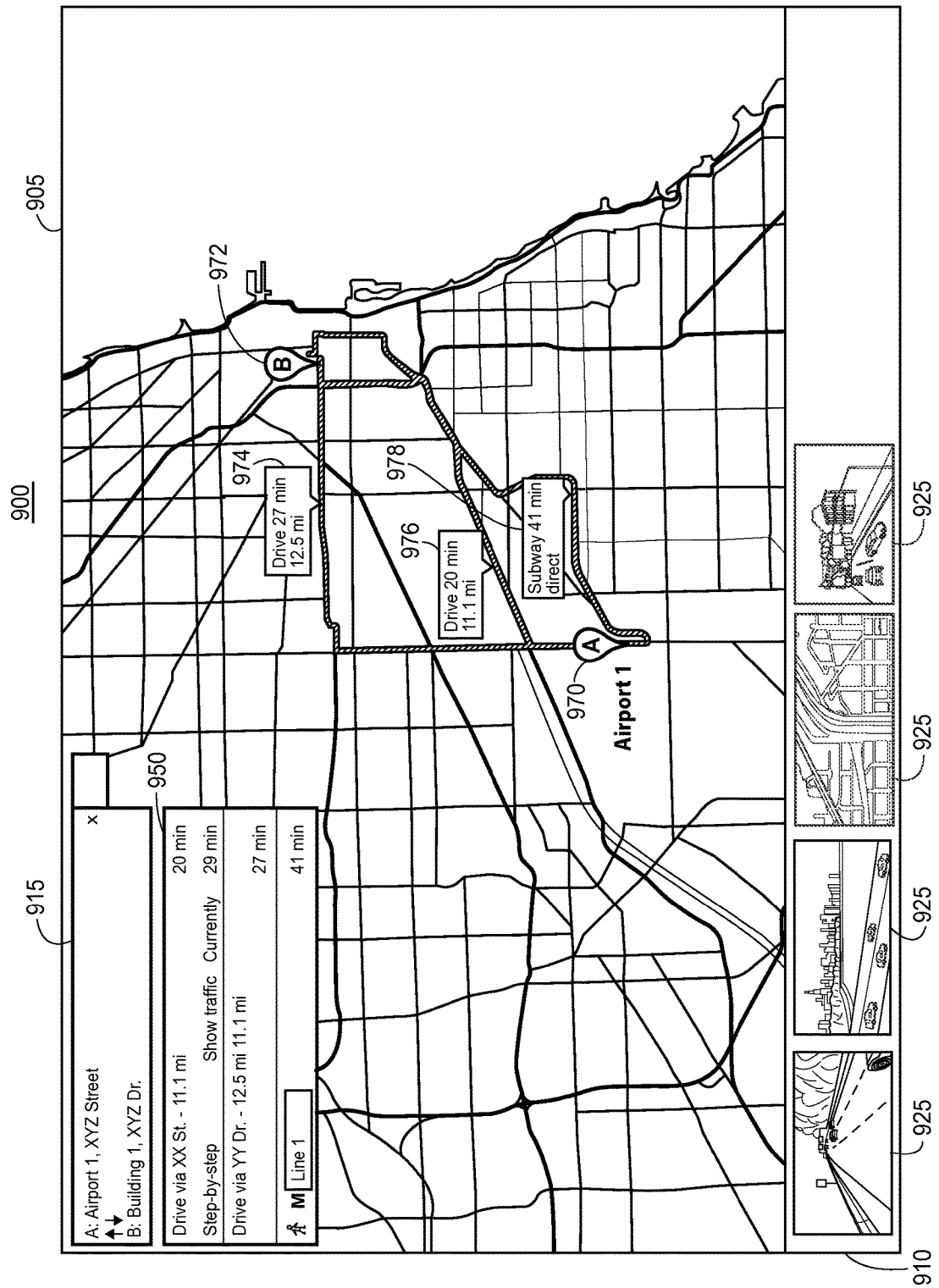
FIG. 9 illustrates an example screenshot of a digital map that can be displayed via the user interface of the client device of FIG. 1.

FIG. 9 illustrates an example screenshot 900 of a digital map 905 that may be displayed at a UI of a computing device as a result of the example systems and methods described herein. The screenshot 900 includes multiple routes from location 970 to location 972: route 974, route 976, and route 978. In the shown example, each route has an associated label indicating transportation mode, travel distance, and estimated travel time. The shown example also includes identifying information for the locations 970 ("Airport 1") and 972 ("Building 1") in the search box 915. An information card 950 includes additional information about each of the routes. The runway 910 includes images 925 associated with the route 974. Each of the images 925 is associated to a map object on or near the route 974. In operation, a user may select a new route by interacting with route 976 or route 978, causing the runway 910 to present new images associated with the selected route. Moreover, as a user begins travelling along one of the routes, the runway 910 may present new images to account for the user's change in position. In other words, new images may "bubble up" in the runway 910 as the user moves closer to the objects associated with the new images.

Figure 10:
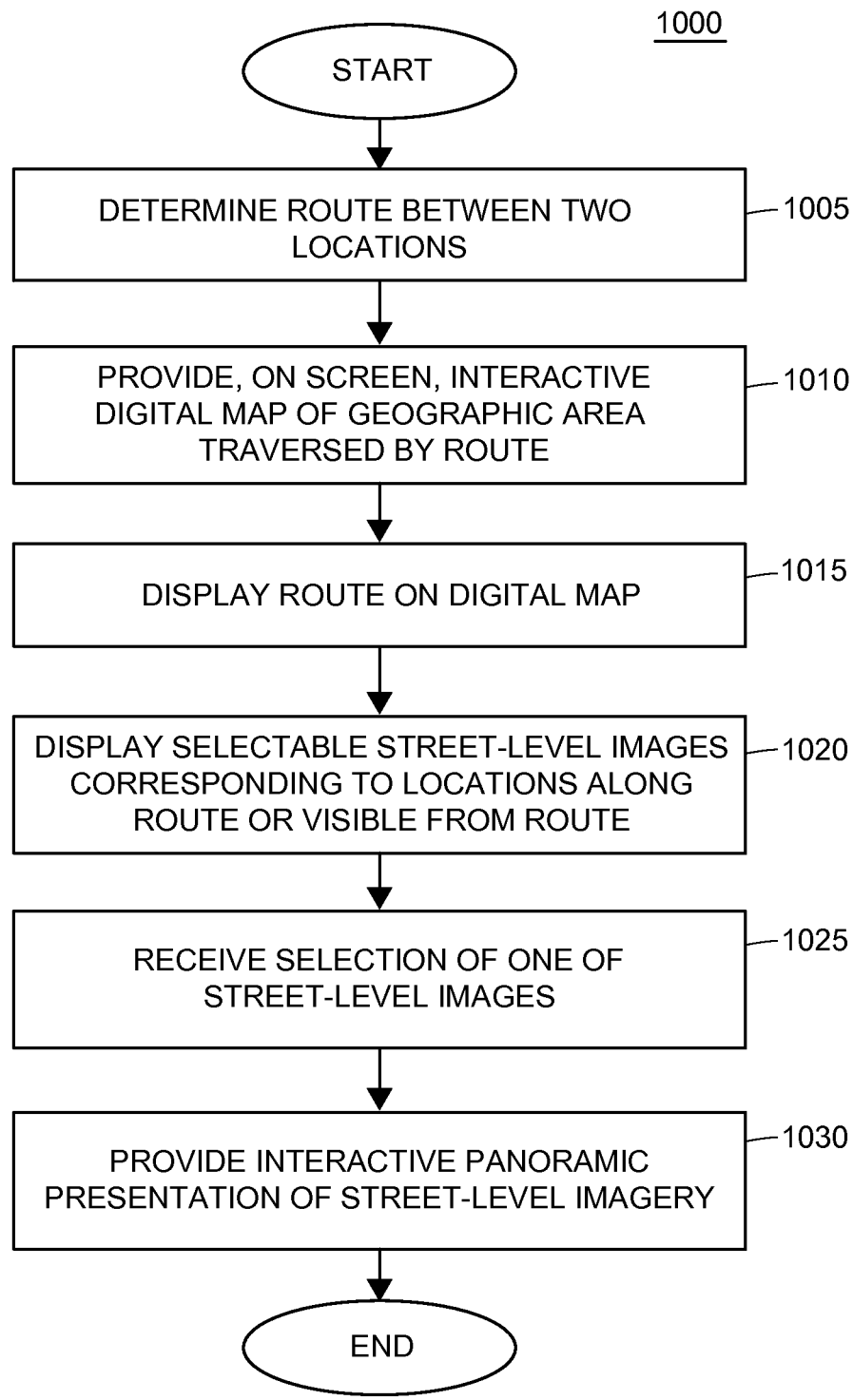
FIG. 10 is a flow diagram of an example method for displaying street-level images corresponding to locations along a route displayed on a digital map, which can be implemented in the computing system of FIG. 1.

FIG. 10 illustrates an example method 1000 for displaying street-level images associated with locations proximate to a route displayed on a digital map and providing a street-level interface for one of the locations. The method 1000 may be implemented, in whole or in part, at the map display system 10 and/or the display system 36 shown in FIG. 1. In particular, the method 1000 may be implemented as a set of instructions stored on a computer-readable memory that are executable by one or more processor(s).

Method 1000 begins when a route is determined between two locations (e.g., between the locations 970 and 972 shown in FIG. 9) (block 1005). The route may be determined by the directions routine 35 of FIG. 1. A UI then provides an interactive digital map of a geographic area traversed by the route (block 1010) and displays the route, such as the route 974 of FIG. 9 (block 1015).

In addition to displaying the interactive digital map and route, the UI displays selectable street-level images corresponding to locations along the route or visible from the route (e.g., the images 925 in the runway 910 shown in FIG. 9) (block 1020). Upon receiving a selection of a displayed image (block 1025), the UI may provide a street-level interface that provides a panoramic presentation of street-level imagery at a location associated with the selected image 925 (block 1030).

Additional Considerations

Throughout this specification, plural instances may implement modules, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. For example, while one or more computing devices may be described throughout this specification as including a single processor, it will be understood that each of the described computing devices may include one or more processor in certain embodiments. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In example implementations, one or more computer systems (e.g., a standalone, client, server, or host computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

The use of the terms "a" and "an" and "the" and similar referents in the context of describing the invention is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate better the feature and does not pose a limitation on the scope of the disclosure unless otherwise claimed. No language in the specification should be construed as indicating any non-claimed element as essential to the disclosure.

While the foregoing description of the present system has been shown and described in connection with various particular embodiments and applications thereof, it has been presented for purposes of illustration and description and is not intended to be exhaustive or to limit the electronic system to the particular embodiments and applications disclosed. It will be apparent to those having ordinary skill in the art that a number of changes, modifications, variations, or alterations to the system as described herein may be made, none of which depart from the spirit or scope of the present disclosure. The particular embodiments and applications were chosen and described to provide the best illustration of the principles of the system and its practical application to thereby enable one of ordinary skill in the art to utilize the system in various embodiments and with various modifications as are suited to the particular use contemplated. All such changes, modifications, variations, and alterations should therefore be seen as being within the scope of the present disclosure.

What is claimed is:

1. A computer-implemented method for providing efficient access to interactive street-level images for geographic locations on a computing device, the method comprising:

providing, by one or more processors, an interactive digital map of a geographic area including a runway via a user interface, the runway including images grouped into separate categories based on types of entities within the geographic area, wherein the types of entities included in the runway are based on one or more context signals including at least one of a time, a date, user profile information, event information, weather information, or traffic information;

receiving, by the one or more processors, a selection of a point on the digital map, wherein the point corresponds to a location within the geographic area;

in response to receiving the selection, generating by the one or more processors an informational card that overlays at least a portion of the digital map, the informational card including two or more images corresponding to the location, the images of at least one of the informational card and the runway including at least one street-level image;

receiving a request via the user interface to activate display of the at least one street-level image of the informational card or runway; and in response to receiving the request, replacing, by the one or more processors, the digital map with an interactive panoramic presentation of the at least one street-level image at the location within the geographic area.

2. The method of claim 1, wherein the computing device is a portable device having a touchscreen, and the method includes displaying the interactive digital map to occupy a majority of the entire touchscreen.

3. The method of claim 2, wherein receiving the selection of the point on the digital map includes detecting a finger gesture applied to the point via the touchscreen.

4. The method of claim 1, wherein receiving the selection of the point on the digital map includes receiving a click event corresponding to the point from a pointing device.

5. The method of claim 1, wherein receiving the selection of the point on the digital map includes detecting a hover event at the point, wherein the hover event corresponds to a mouse pointer or finger being positioned over the point longer than a predetermined amount of time.

6. The method of claim 1, wherein the informational card is provided in response to only the selection of the point.

7. The method of claim 1, wherein replacing the digital map with the interactive panoramic presentation of the at least one street-level image includes providing a three-dimensional (3D) walkthrough environment on a display of the computing device.

8. The method of claim 1, wherein the two or more images are photographic images.

9. A system for providing efficient access to interactive street-level images for geographic locations, the system comprising:
one or more processors;
a user interface coupled to the one or more processors, the user interface configured to detect user input and display user output; and
a non-transitory computer-readable medium coupled to the one or more processors, the computer-readable medium storing thereon instructions that, when executed by at least one of the one or more processors, cause the one or more processors to:
provide an interactive digital map of a geographic area including a runway via the user interface, the runway including images grouped into separate categories based on types of entities within the geographic area, wherein the types of entities included in the runway are based on one or more context signals including at least one of a time, a date, user profile information, event information, weather information, or traffic information;
receive a selection of a point on the digital map, wherein the point corresponds to a location within the geographic area;
in response to receiving the selection, generate an informational card that overlays at least a portion of the digital map, the informational card including two or more images corresponding to the location, the images of at least one of the informational card and the runway including at least one street-level image;
receive a request via the user interface to activate display of the at least one street-level image of the informational card or runway; and
in response to receiving the request, replace the digital map with an interactive panoramic presentation of the at least one street-level image at the location within the geographic area.

10. The system of claim 9, wherein reception of the selection of the point on the digital map includes performing a detection of a finger gesture applied to the point via a touchscreen.

11. The system of claim 9, wherein reception of the selection of the point on the digital map includes identification of a click event corresponding to the point from a pointing device.

12. The system of claim 9, wherein reception of the selection of the point on the digital map includes performing a detection of a hover event at the point, wherein the hover event corresponds to a mouse pointer or finger being positioned over the point longer than a predetermined amount of time.

13. The system of claim 9, wherein the informational card is provided in response to only the selection of the point.

14. The system of claim 9, wherein the system further includes a display device and replacement of the digital map with the interactive panoramic presentation of the at least one street-level image includes displaying a three-dimensional (3D) walkthrough environment on the display device.

15. A non-transitory computer-readable medium storing thereon instructions for providing efficient access to interactive street-level images for geographic locations, wherein the instructions, when executed by one or more processors of a computing device, cause the one or more processors to:
provide an interactive digital map of a geographic area including a runway via a user interface, the runway including images grouped into separate categories based on types of entities within the geographic area, wherein the types of entities included in the runway are based on one or more context signals including at least one of a time, a date, user profile information, event information, weather information, or traffic information;
receive a selection of a point on the digital map, wherein the point corresponds to a location within the geographic area;
in response to receiving the selection, generate an informational card that overlays at least a portion of the digital map, the informational card including two or more images corresponding to the location, the images of at least one of the informational card and the runway including at least one street-level image;
receive a request via the user interface to activate display of the at least one street-level image of the informational card or runway; and
in response to receiving the request, replace the digital map with an interactive panoramic presentation of the at least one street-level image at the location within the geographic area.

16. The computer-readable medium of claim 15, wherein the computing device is a portable device having a touchscreen, and the one or more processors are configured to display the interactive digital map to occupy a majority of the entire touchscreen.

17. The computer-readable medium of claim 16, wherein the one or more processors are configured to receive the selection of the point on the digital map by detecting a finger gesture applied to the point via the touchscreen.

18. The computer-readable medium of claim 15, wherein receiving the selection of the point on the digital map includes either:
receiving a click event corresponding to the point from a pointing device; or detecting a hover event at the point, wherein the hover event corresponds to a mouse pointer or finger being positioned over the point longer than a predetermined amount of time.

19. The computer-readable medium of claim 15, wherein the informational card is provided in response to only the selection of the point.

20. The computer-readable medium of claim 15, wherein the one or more processors are configured to replace the digital map with the interactive panoramic presentation of the at least one street-level image by providing a three-dimensional (3D) walkthrough environment on a display of the computing device.

* * * * *